United States Patent

Kawamura

[11] Patent Number: 5,809,777
[45] Date of Patent: Sep. 22, 1998

[54] DIESEL PARTICULATE FILTER APPARATUS

[75] Inventor: Hideo Kawamura, Kanagawa-ken, Japan

[73] Assignee: Isuzu Ceramics Research Institute Co., Ltd., Kanagawa-ken, Japan

[21] Appl. No.: 789,987

[22] Filed: Jan. 28, 1997

Related U.S. Application Data

[62] Division of Ser. No. 449,896, May 23, 1995, Pat. No. 5,651,250.

[30] Foreign Application Priority Data

May 24, 1994 [JP] Japan .................................. 6-132453
May 24, 1994 [JP] Japan .................................. 6-132454

[51] Int. Cl.⁶ .................................................... F01N 3/02
[52] U.S. Cl. .............................. 60/303; 55/466; 55/486; 55/523; 55/DIG. 30; 60/311
[58] Field of Search ........................ 60/303, 311; 55/486, 55/523, DIG. 30, DIG. 45, 466

[56] References Cited

U.S. PATENT DOCUMENTS

| | | | |
|---|---|---|---|
| 4,205,971 | 6/1980 | Abthoff | 55/486 |
| 4,478,618 | 10/1984 | Bly et al. | 55/523 |
| 4,829,766 | 5/1989 | Henkel | 60/311 |
| 4,838,903 | 6/1989 | Thomaides | 55/486 |
| 4,878,929 | 11/1989 | Tofsland | 55/486 |
| 4,940,476 | 7/1990 | Buck | 55/486 |
| 5,087,272 | 2/1992 | Nixdorf | 60/311 |
| 5,121,601 | 6/1992 | Kammel | 60/288 |
| 5,212,948 | 5/1993 | Gillingham et al. | 60/311 |
| 5,248,481 | 9/1993 | Bloom et al. | 60/311 |
| 5,250,094 | 10/1993 | Chung et al. | 55/523 |
| 5,258,164 | 11/1993 | Bloom et al. | 60/311 |
| 5,266,279 | 11/1993 | Haerle | 55/523 |
| 5,409,669 | 4/1995 | Smith et al. | 55/523 |

FOREIGN PATENT DOCUMENTS

| | | |
|---|---|---|
| 0258547 | 3/1988 | European Pat. Off. . |
| 0275372 | 7/1988 | European Pat. Off. . |
| 0336883 | 11/1989 | European Pat. Off. . |
| 2600907 | 1/1988 | France . |
| 256812 | 10/1990 | Japan . |
| 9318841 | 9/1993 | WIPO . |

OTHER PUBLICATIONS

Kusuda, Tasao et al, Patent Abstracts of Japan, Diesel Exhaust Gas Cleaning Device, vol. 12, No. 190, Mar. 6, 1988.

*Primary Examiner*—Douglas Hart
*Attorney, Agent, or Firm*—Browdy and Neimark

[57] ABSTRACT

In this DPF apparatus, the filters have large trapping areas and three-dimensionally and efficiently trap particulates contained in the exhaust gas thereby cleaning the gas and reducing the size of the apparatus. The DPF apparatus has the main filter installed in the case incorporated into the exhaust system, the sub-filter arranged in the central portion of the main filter, and the bypass cylinder interposed between these filters. The bypass valve is installed on the exhaust gas inflow side of the sub-filter to open and close the inflow port of the sub-filter. The main filter and the sub-filter are made from ceramics porous sheet filters, or comprise a nonwoven cloth made of silicon carbide fibers and a woven cloth made of ceramics long fibers chosen from Si-C and Si-C-Ti-O long fibers and arranged adjacent to and downstream of the nonwoven cloth. The mesh heaters are laminated over the main filter on the exhaust gas inflow side.

6 Claims, 8 Drawing Sheets

DIESEL PARTICULATE FILTER APPARATUS

This is a division of parent application Ser. No. 08/449,896, filed May 23, 1995, now U.S. Pat. No. 5,651,250, which issued on Jul. 29, 1997.

BACKGROUND OF THE INVENTION

1. Field of the Invention

The present invention relates to a diesel particulate filter apparatus (hereinafter referred to simply as a DPF apparatus), which is incorporated in an exhaust system to clean exhaust gases discharged form diesel engines.

2. Description of the Prior Art

Combustion of diesel engine involves a so-called heterogeneous mixing whereby a fuel is injected into a high-temperature, high-pressure air. Unlike a homogeneous mixture, the heterogeneous mixture has its components, air and fuel, not uniformly mixed, so that carbon component in the fuel is heated during combustion to high temperature to become soot and hydrocarbon (HC), which coagulate into particulates and are discharged outside, contaminating the surrounding environment.

Conventional exhaust gas processing equipment that treat exhaust gases from engines have a filter with a large area to arrest carbon at its front part. To burn up the accumulated carbon, the particulate filter is provided with a heater that burns particulates including deposited carbon to regenerate the filter.

Japan Patent Laid-Open No. 256812/1990 discloses a particulate trap that can be regenerated electrically. The electrically regenerative particulate trap comprises a gas transmissive support, a fiber layer made up of a plurality of ceramics fibers, and a heater. The fiber layer is disposed together with the heater in a space radially extending from the gas transmissive support. The exhaust gas is passed through pores in the fiber layer to collect particulates contained in the exhaust gas into an area near the heater. By supplying electricity to the heater, the collected particulates are burned up. The fiber layer is a woven cloth with a uniform porosity of less than $1.5 L/M/cm^2$ and which remains stable for long period at about 1,150° C. and has gaps between fibers not greater than 7.5 times the fiber diameter. The material of the ceramics fiber includes continuous molten silica, glass, alumina silica, zirconia silica, alumina chromia, titania, graphite, silicon carbide, and alumina boria silica. The ceramics fibers are braided or wound directly on the gas transmissive support or heater.

The DPF apparatus, because it is mounted on automobiles, is required to be formed as compact as possible and efficient in collecting particulates such as carbon, soot and HC. Particulates in general are synthesized substances from carbon and hydrocarbon and vary in size from several $\mu m$ to several tens of $\mu m$. The particulates easily burn on reaction with oxygen but require high temperatures for combustion, and hence they cannot completely burn only with the exhaust gas heat. The conventional regenerative DPF apparatus has two filters of the same size parallelly arranged in the direction of exhaust gas flow. When one of the filters becomes clogged with arrested particulates, the exhaust gas is passed through the other filter, with the clogged filter supplied with air in an amount required for combustion of the accumulated particulates and then heated to burn the particulates to regenerate the filter.

There have been developed many regenerative DPF apparatuses that can remove particulates and smoke, but they have the drawback of being complex in construction and function and thus cannot be put into practical use. For instance, the particulates arrested by the filter, when they accumulate, are heated and burned by a spark glow plug or heater.

SUMMARY OF THE INVENTION

A primary objective of this invention is to solve the above-mentioned problem, i.e., to provide a diesel particulate filter apparatus (DPF apparatus) having a light and compact filter structure, in which ceramics fibers that arrest particulates such as carbon, soot and HC contained in the combustion gas from the diesel engine are formed into a sheet and in which a mesh heater is incorporated in or laminated on the sheet filter.

Another object of this invention is to apply the above-mentioned filter structure to the DPF apparatus, i.e., to provide a DPF apparatus, in which a main filter and a sub-filter are formed of the sheet filter; in which the sub-filter through which the exhaust gas is passed during the heating regeneration of the main filter is provided in the central portion of the main filter; in which the resistances to gas ventilation of the main filter and the sub-filter are so preset as to balance each other; in which an open-close valve is provided only to the sub-filter; and in which a mesh heater for regeneration is provided only to the main filter.

A further objective of this invention is to solve the above problem, that is, to provide a DPF apparatus having a filter structure, which has a filter for trapping particulates contained in the combustion gas from the diesel engine and a mesh heater provided adjacent to the filter to heat and burn the particulates trapped by the filter; in which a heat-and acid-resistant material is used to form the filter; in which the filter is formed in a three-dimensional structure by combining nonwoven cloth and woven cloth in order to raise the particulate trapping efficiency; and which can prevent dispersing of the fibers of the nonwoven cloth to prevent environmental pollution.

A further objective of this invention is to provide a compact DPF apparatus which allows easy trapping of particulates and filter regeneration; in which the filter with the above characteristic is made up of a main filter and a sub-filter through which the exhaust gas is passed during the regenerating by heating of the main filter; in which the gas ventilation resistances of the main filter and the sub-filter are preset to balance each other; in which the sub-filter is provided with an open-close valve; and in which the main filter is provided with a mesh heater for regeneration.

In the DPF apparatus which has a filter installed in a case incorporated in an exhaust system of the diesel engine and a mesh heater to heat the filter, and which traps particulates contained in the exhaust gas by the filter and burns the trapped particulates by applying electricity to the mesh heater; it is a primary object of this invention to provide a DPF apparatus having a filter structure, which comprises a filter made by laminating ceramics long fibers and bonding the ceramics long fibers with a liquid ceramics material, and a mesh conductor arranged and fixed on the entire surface of the filter. In this filter structure, therefore, the filter is made in the form of a thin sheet and is light in weight and heat-and acid-resistant. The filter structure also allows the filter to be easily formed compact in a desired shape, most suited for the DPF apparatus. Further, because the trapping area of the filter is large, the filter can trap particulates contained in the exhaust gas efficiently. The coarse and fine porosity of the filter body can be changed easily by changing the diameters of ceramics fibers used.

The filter comprises a sheet filter and a mesh heater made of a conductive heat-resistant metal laminated on and fixed to the sheet filter. The sheet filter is made by forming into a porous sheet a slurry—a mixture of Si-C or Si-C-Ti-O silicon carbide fibers, polycarbosilane solution, polytitanocarbosilane solution, and any of polysilanestylene, polysilane and polysilazane solutions—and by sintering the porous sheet in the presence of Ar or in vacuum to convert the solutions into Si-C or Si-C-Ti-O.

Further, the Si-C or Si-C-Ti-O silicon carbide fibers are long fibers cut to 2–10 mm or whiskers made by vapor deposition.

Alternatively, the filter is made by forming into a sheet a slurry, which is a mixture of $Si_3N_4$ long fibers and polysilazane, polycarbosilane and perhydropolysilazane solutions, and by sintering the sheet in the presence of $NH_3$ gas to compound it into a porous ceramics sheet.

The filter may also be made by mixing mullite $Al_6Si_2O_3$ or $Al_2O_3$ and polyaluminoxane solution to form a slurry and by forming the slurry into a sheet.

The mesh heater is laminated between the sheet filters, with the sheet filter downstream of the exhaust gas flow having finer gaps between fibers than the upstream sheet filter.

The mesh heater may also be formed by coating a fine metal mesh with silicon carbide fibers and then sintering the composite layers.

In the DPF apparatus which traps particulates contained in the exhaust gas by means of a filter with a mesh heater installed in the case and burns the trapped particulates by supplying electricity to the mesh heater; it is a further object of this invention to provide a DPF apparatus having a filter structure, which comprises: a nonwoven cloth of silicon carbide fibers; a woven cloth of ceramics long fibers located adjacent to and downstream of the nonwoven cloth with respect to the exhaust gas flow; a mesh heater arranged adjacent to and upstream of the nonwoven cloth with respect to the exhaust gas flow; and a fixing member for securely holding together the nonwoven cloth, the woven cloth and the mesh heater.

Hence, the filter structure is characterized in that the filter material has an excellent heat and acid resistance, and that the exhaust gas flows zigzag through the laminated filter fibers, allowing particulates such as carbon, soot and smoke contained in the exhaust gas to be trapped by the fibers and their crossings. The trapped particulates become cores for facilitating particulate deposition, producing a three-dimensional filter effect. Further, fibers of the nonwoven cloth, which are easily separated and dispersed, can be prevented from dispersing and flowing downstream by the woven cloth.

The ceramics long fibers forming the woven cloth is selected from Si-C and Si-C-Ti-O long fibers. Further, the woven cloth made by laminating Si-C or Si-C-ti-O long fibers and having coarser fiber gaps than the above woven cloth is arranged adjacent to and upstream of the mesh heater with respect to the exhaust gas flow. Hence, if the mesh heater is deformed by thermal stress, the wires of the mesh heater can be prevented from contacting each other, thus ensuring the uniform heating of the filter. This prevents local overheating of the filter and allows the particulates trapped by the filter to be burned well, regenerating the filter in good condition and improving its durability. Further, the heat-resistant steel wires containing Ni-Cr and forming the mesh heater are coated with a non-conductive material such as $Al_2O_3$ to prevent oxidation.

A further object of this invention is to provide a DPF apparatus, which comprises: a main filter formed of the sheet filter located inside the case; a mesh heater located on the exhaust gas inlet side of the main filter; a sub-filter formed of the sheet filter and arranged inside a bypass cylinder located in the central portion of the main filter in such a way that it is parallel with the main filter with respect to the exhaust gas flow; a bypass valve located upstream of the sub-filter with respect to the exhaust gas flow to open and close the bypass cylinder; and an actuator to activate the bypass valve; wherein a gas ventilation resistance of the sub-filter is set smaller than that of the main filter.

In this DPF apparatus, the main filter can be formed of the nonwoven cloth, the woven cloth and the mesh heater. In the bypass cylinder located in the central portion of the main filter, the sub-filter can be made coarser in porosity than the main filter and arranged parallel with the main filter made of the nonwoven cloth, the woven cloth and the mesh heater.

Hence, the DPF apparatus allows the above-mentioned filter structure to be assembled easily, and obviates the need to provide a changeover valve at the inlet of the main filter, to install a heater on the sub-filter or to provide a pump for sending air to the main filter during the regeneration of the main filter. The apparatus can therefore be made compact as a whole. When the bypass valve is closed, the apparatus allows the exhaust gas to be smoothly cleaned by the main filter which traps particulates contained in the exhaust gas.

The main filter is made in the form of a pleated cylinder by successively folding the sheet filter. The sub-filter is formed cylindrical using the sheet filter and is arranged inside and parallel with the main filter with respect to the exhaust gas flow.

Alternatively, the main filter may be formed cylindrical using the sheet filter that is laminated in parallel with the exhaust gas flow. The sub-filter is formed cylindrical using the sheet filter and is arranged inside and parallel with the main filter with respect to the exhaust gas flow.

Because the diesel engine is supplied with an excess volume of air for a required amount of fuel, the exhaust gas discharged from the diesel engine contains about 20% of air even during full load operation. When the main filter is regenerated, passing a small amount of exhaust gas through the main filter can provide a sufficient volume of oxygen to burn particulates trapped in the main filter.

By setting the gas ventilation resistance of the sub-filter smaller than that of the main filter, a large volume of exhaust gas flows through the sub-filter when the bypass valve is opened. A small amount of exhaust gas also flows through the main filter that has trapped particulates, thus supplying a sufficient amount of oxygen to burn the particulates trapped in the main filter. Further, when the main filter is being regenerated, the amount of exhaust gas flowing into the main filter is small, that is, there is no possibility of an excess volume of exhaust gas flowing to the main filter, thus preventing the particulates from being cooled by the exhaust gas and their combustion from deteriorating.

When the bypass valve is closed to supply the exhaust gas to the main filter, the exhaust gas leaking from the bypass valve flows into the sub-filter, so that the particulates that were trapped in the sub-filter during the regeneration of the main filter can be burned with oxygen contained in the leaking exhaust gas, regenerating the sub-filter. Furthermore, because the sub-filter is located inside the main filter, the particulates in the sub-filter are prevented from being cooled.

The DPF apparatus therefore has the following advantages. Regenerating the main filter by burning particulates trapped in the main filter requires only opening the bypass valve and supplying electricity to the mesh heater, and there is no need to provide a changeover valve at the inlet of the main filter, install a heater on the sub-filter or provide a separate pump for sending air into the main filter. By setting an appropriate balance between the gas ventilation resistances of the main filter and the sub-filter, it is possible to supply a small amount of exhaust gas to the main filter, obviating the need for an air supply apparatus that has conventionally been used for burning the trapped particulates. Furthermore, the DPF apparatus itself can be formed compact and simple in construction, rendering very simple the function of processing exhaust gas from the diesel engine and making it possible to continuously clean exhaust gases. Because of its simple and compact construction, the apparatus can be mounted in a limited space in automobiles.

DETAILED DESCRIPTION OF EMBODIMENTS

By referring to the accompanying drawings, embodiments of the diesel particulate filter apparatus (hereinafter referred to simply as a DPF apparatus) of this invention are described. In this DPF apparatus, a filter structure comprises a filter, in which long ceramics fibers are laminated and bonded together with a liquid ceramics, and a meshlike conductor attached to the entire surface of the filter. In more concrete terms, the filter structure comprises: a sheet filter that is fabricated by processing slurry—a mixture of SiC or Si-C-Ti-O fibers, polycarbosilane solution, polytitanocarbosilane solution and any of polysilanestylene, polysilane and polysilazane solutions—to make a porous sheet and sintering the porous sheet to convert these solutions into SiC or Si-C-Ti-O; and a mesh heater formed of heat resistant conductive metal laminated on the sheet filter. This filter structure therefore has the mesh heater of heat-resistant, acid-resistant conductive metal laminated on the sheet filter fabricated as mentioned above.

Figure 1:
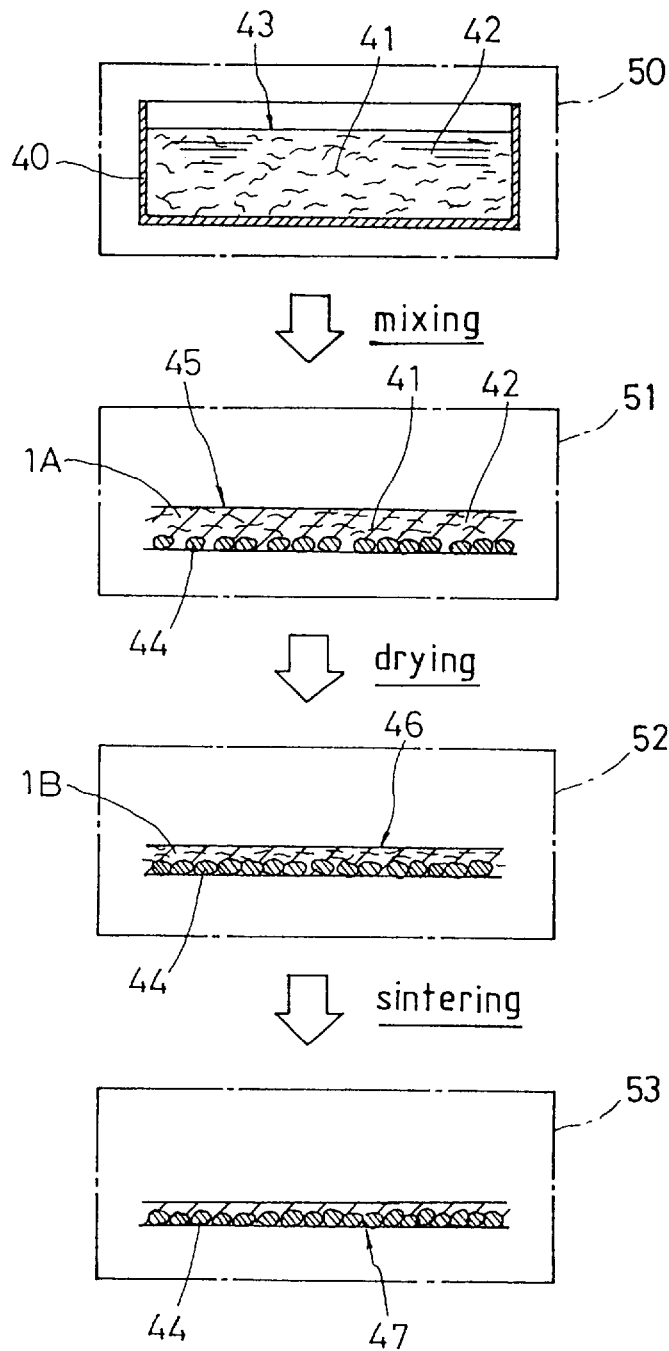
FIG. 1 is a diagram showing the process of manufacturing the DPF apparatus of this invention.

This DPF apparatus may be manufactured, for example, by the process shown in FIG. 1. First, SiC or Si-C-Ti-O non-woven fibers 41 and polycarbosilane or molten ceramics 42 are put in a container 40 (step 50) and then mixed to make a slurry 43. Next, the slurry 43 is poured over a metal mesh 44 to form a sheet-like solidified material 45. At this time, in the solidified sheet material 45, cross points between the nonwoven fibers 41 are attached with polycarbosilane or polytitanocarbosilane, transforming the slurry sheet into a solidified sheet material 1A with the nonwoven fibers 41 fixed with polycarbosilane 42 (step 51). The solidified sheet material 45 is dried to make a sheetlike formed body 1B of a dry SiC fiber sheet 46 (step 52). Next, the sheetlike formed body 1B is fired at a temperature of 1,400° C to make a laminated sheet filter 47 (step 53). At this time, polycarbosilane 42 is fired in the presence of Ar or in vacuum and transformed into SiC, thereby forming a porous laminated sheet filter 47 from the fiber sheet. The sheet filter 47 has the metal mesh 44 embedded therein or laminated thereto, which, when the sheet filter 47 is incorporated into the diesel particulate filter, functions as a mesh heater 6 described later. At this time, the mesh heater 6 may be formed by processing silicon carbide with a fine metal mesh. It is also possible to form the sheet filter 47 without laying the metal mesh 44 and then to combine and fix together the metal mesh 44 and the sheet filter 47.

In the DPF apparatus, it is preferred that when the sheet filter 47 is incorporated into the DPF apparatus, the mesh heater 6 be arranged upstream the sheet filter 47 with respect to the exhaust gas flow in the process of regeneration. Of the sheet filters 47 laminated on both sides of the mesh heater 6, the one arranged on the downstream side with respect to the exhaust gas flow may have fibers arranged closer together than does the upstream-side sheet filter 47. The mesh heater 6 may be securely fixed to the sheet filter 47 by using a fixing means such as a metal wire or may be sandwiched between the sheet filters 47. When the mesh heater 6 is laminated between the sheet filters 47, the downstream-side sheet filter 47 is so formed as to have finer fiber gaps than the upstream-side sheet filter 47, in order to trap particulates such as carbon, soot and smoke efficiently. The fine and coarse porous structure of the sheet filter 47 can be obtained by changing the diameters of the ceramics fibers making up the sheet filter 47.

Figure 2:
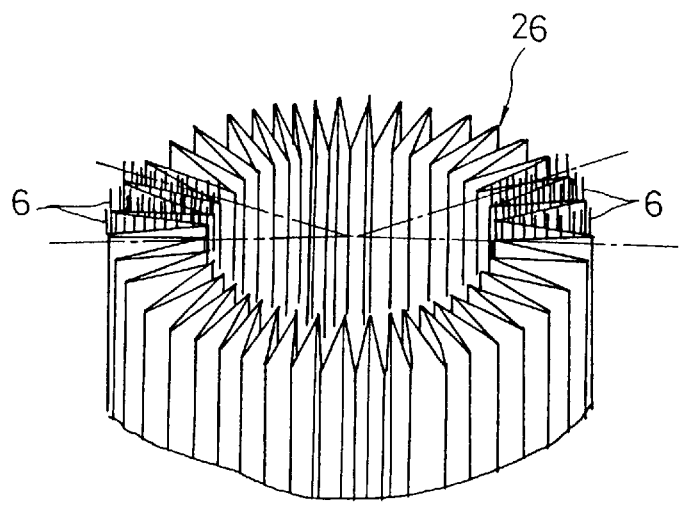
FIG. 2 is a perspective view showing one embodiment of the filter structure of FIG. 1.

The DPF apparatus is installed in the exhaust system of the diesel engine to trap particulates such as carbon, soot and smoke contained in the exhaust gas and to burn these particulates. FIG. 2 shows one embodiment of the sheet filter that can be incorporated into the DPF apparatus. The sheet filter 47 of this embodiment constitutes a filter 26 with a structure that can be used as a main filter 1 described later. The filter 26 is folded a predetermined radial length repetitively to form a cylinder of pleats. While FIG. 2 shows the mesh heater 6 at only partial areas of the end portion of the filter 26, the mesh heater 6 can be projected from the entire surface of the end portion to form mesh terminals.

Figure 3:
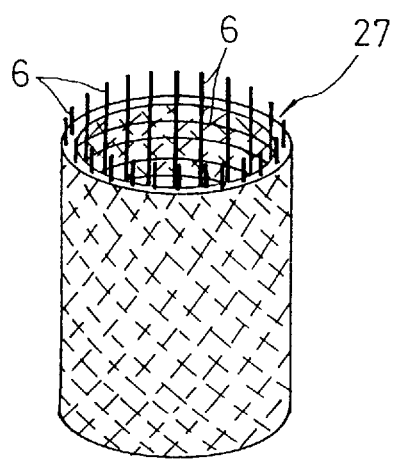
FIG. 3 is a perspective view showing another embodiment of the filter structure of FIG. 1.

Alternatively, the main filter 1 may be formed in a shape shown in FIG. 3 for incorporation into the DPF apparatus. FIG. 3 shows another embodiment of the sheet filter that can be built into the DPF apparatus. The sheet filter 47 of this embodiment is formed as a cylindrical filter 27 laminated with the mesh heater 6 arranged longitudinally in the direction of exhaust gas flow and can be used as the main filter 1 of an embodiment described later. Although not shown, the filter 27 can also be formed in a structure having no laminated mesh heater. The filter without the mesh heater can be applied as a sub-filter 2 described later.

Figure 4:
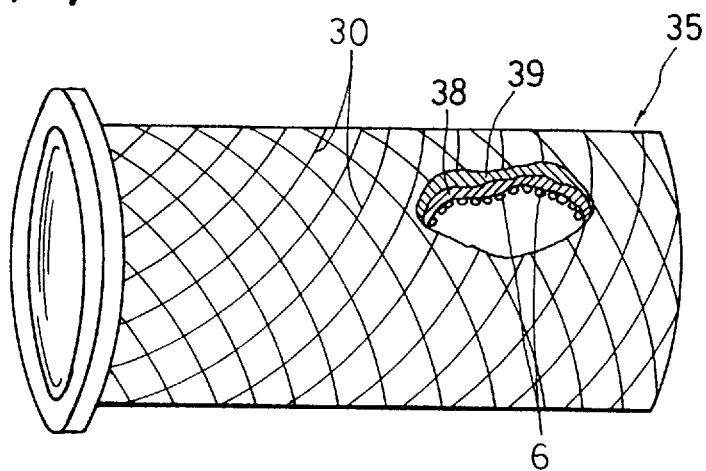
FIG. 4 is a partly cutaway, perspective view showing one embodiment of the DPF apparatus of this invention.
Figure 5:
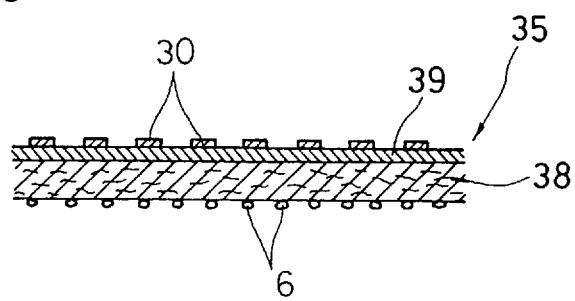
FIG. 5 is a cross section showing one example of filter structure of FIG. 4.

Next, another embodiment of the filter structure is described by referring to FIG. 4 and 5. The DPF apparatus is installed in the exhaust system of the diesel engine to trap particulates such as carbon, soot and smoke contained in the exhaust gas and burn these particulates. As shown in FIG. 4 and 5, the filter 35 is made up of a nonwoven cloth 38 of silicon carbide fibers and a woven cloth 39 of Si-C or Si-C-Ti-O long fibers installed adjacent to and downstream of the nonwoven cloth 38 with respect to the exhaust gas flow. This filter structure includes a mesh heater 6 installed adjacent to and upstream of the nonwoven cloth 38 with respect to the exhaust gas flow, and a fixing member 30 that holds the nonwoven and woven cloth 38, 39 and the mesh heater 6 together. The fixing member 30 may be U-shaped needles, staples, U-shaped clasps and cage-like needless. When an exhaust gas is passed through the nonwoven cloth 38, there is a possibility of fibers being blown away from the nonwoven cloth 38. With the woven cloth 39 arranged downstream of the nonwoven cloth 38, however, the fibers blown from the nonwoven cloth 38 are caught by the woven cloth 39, thus preventing the fibers of the nonwoven cloth 38 from dispersing downstream of the woven cloth 39.

Wires forming the mesh heater 6 are coated with a nonconductive material such as $Al_2O_3$. The coat of nonconductive material on the mesh heater 6 prevents the mesh heater 6 from being heated ununiformly when the wires of the mesh heater 6 supplied with electricity contact each other. The filter 35 can be used as the main filter 1.

Figure 6:
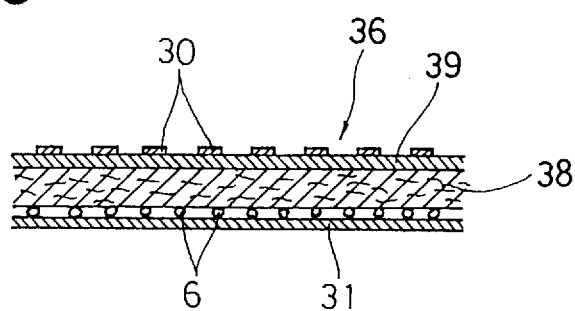
FIG. 6 is a cross section showing another example of the filter structure.

Next, still another embodiment of the filter structure is described by referring to FIG. 6. This embodiment has the similar structure to the filter 35 of the preceding embodiment, except that a woven cloth 31, which is made from Si-C or Si-C-Ti-O long fibers and is coarser in porous structure than the woven cloth 39, is arranged adjacent to and upstream of the mesh heater 6 with respect to the exhaust gas flow. Like reference numerals represent the same components as those of FIG. 5. With the very coarse woven cloth 31 arranged upstream of and secured to the mesh heater 6, it is possible to prevent the wires of the mesh heater from contacting each other due to deformation by thermal stress of the mesh heater 6 and thereby to prevent uneven heating of the filter 36. This assures uniform heating of the filter, which can be used as the main filter 1.

Figure 7:
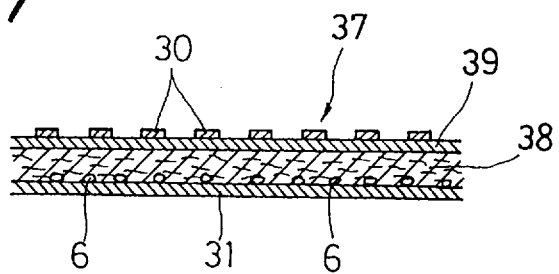
FIG. 7 is a cross section showing still another example of the filter structure.

A further embodiment of the filter structure is explained by referring to FIG. 7. This embodiment is the same in construction as the filter 36 of FIG. 6, except that the mesh heater 6 is provided inside the nonwoven cloth. Like reference numerals represent the same components as those of FIG. 6. The filter 37 can be used as the main filter 1 or sub-filter 2.

Figure 8:
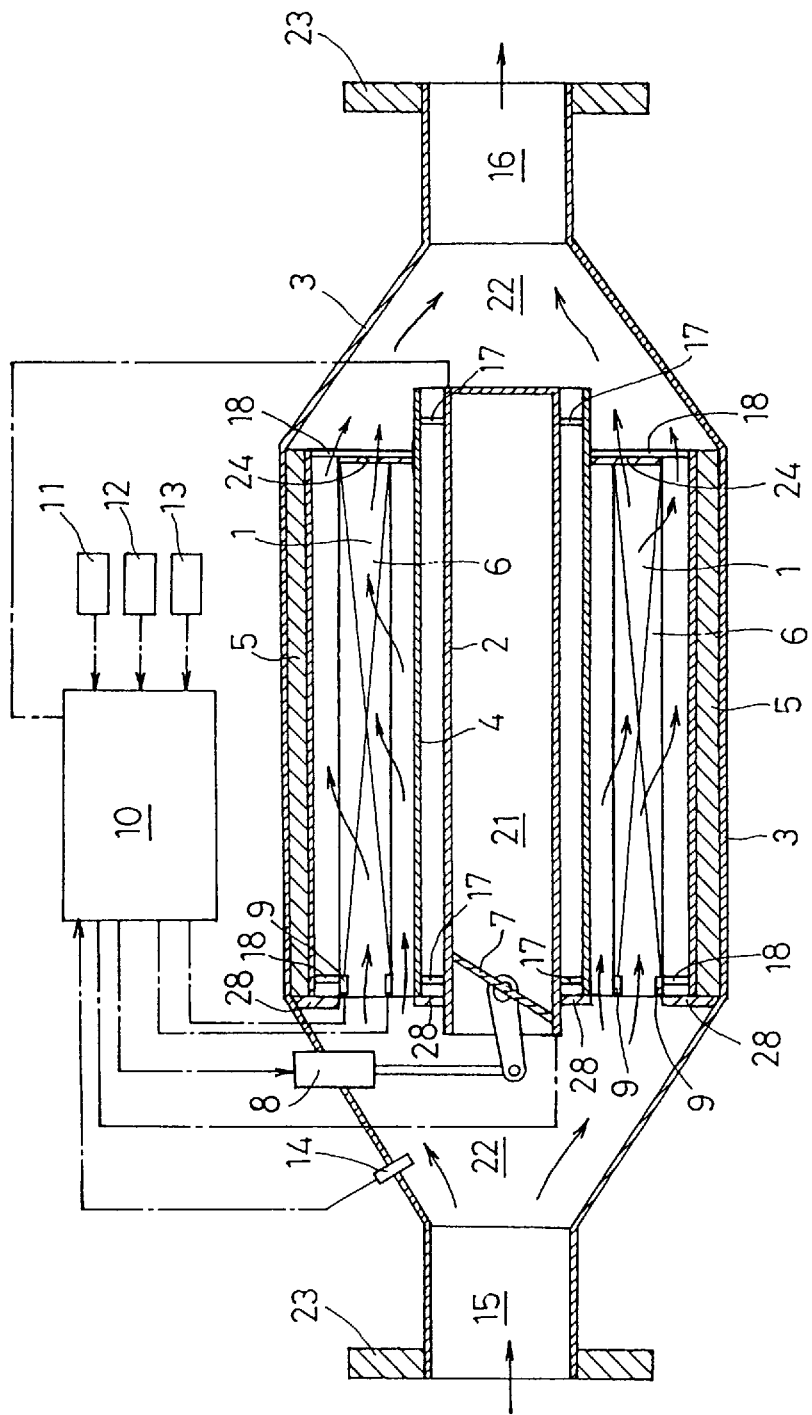
FIG. 8 is a cross section showing one example of the DPF apparatus employing the filter structure of this invention and showing the bypass valve closed.
Figure 9:
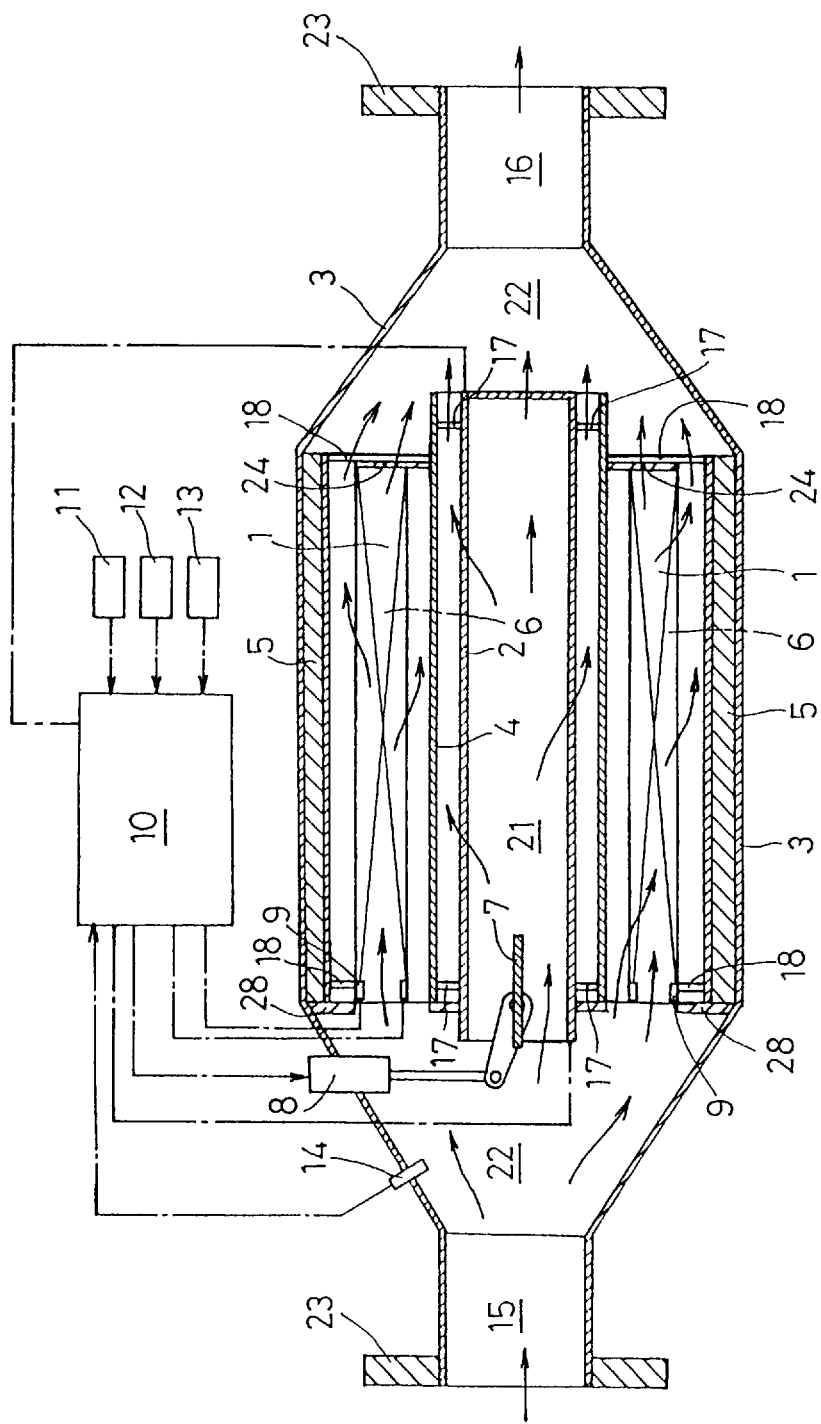
FIG. 9 is a cross section of the DPF apparatus of FIG. 8 showing the bypass valve open.

By referring to FIG. 8 and 9, a further embodiment of the DPF apparatus is described. This DPF apparatus employs the sheet filter 47 of FIG. 1 as the main filter 1 and a cylindrical sheet filter without the mesh heater as the sub-filter 2. The apparatus has a case 3 connected through a flange 23 to an exhaust pipe (not shown) of the diesel engine. In the case 3 there are installed the main filter 1 and the sub-filter 2 for trapping particulates, which are arranged parallelly in the direction of exhaust gas flow and separated by a bypass cylinder 4 along the exhaust gas flow, and which extend from an inlet 15 to an outlet 16. Between the case 3 and the main filter 1 is arranged a heat shielding material 5 that prevents heat from dissipating from the main filter 1 through the case 3 to the outside.

In this embodiment, the main filter 1 is installed in an exhaust gas passage 22, the peripheral end portion of the main filter 1 on the exhaust gas inlet 15 side is closed by a shield plate 28, and the end surface of the main filter 1 on the exhaust gas outlet 16 side is closed by a platelike sheet filter 24. The platelike sheet filter 24 can be made from the sheet filter 47. Arranged inside the main filter 1 is a shield bypass cylinder 4 which interrupts the flow of exhaust gas between the main filter 1 and the sub-filter 2. The sub-filter 2 is installed inside the bypass cylinder 4. The main filter 1 and the bypass cylinder 4 are rigidly secured to the case 3 by a stay 18, and the sub-filter 2 is secured to the bypass cylinder 4 by a stay 17. The sub-filter 2 is installed in the central portion of the main filter 1 with the bypass cylinder 4 interposed therebetween, in such a way that the sub-filter 2 is parallel with the main filter 1 with respect to the direction of exhaust gas flow.

The DPF apparatus has the mesh heater 6 attached on the surface of the main filter 1. The supply of electricity to the mesh heater 6 to burn particulates trapped by the main filter 1 is controlled by a controller 10. The mesh heater 6 extends over the entire surface of the main filter 1 on the inflow side of the exhaust gas passage 22 and are connected to the controller 10 through the electrode terminals 9. The mesh heater 6 is made of a Ni metal and can heat the surface of the main filter 1 uniformly.

On the exhaust gas inflow side of the sub-filter 2 is installed a bypass valve 7 that opens and closes the inlet of the sub-filter 2. The bypass valve 7 is opened and closed by an actuator 8 driven by the controller 10. The bypass valve 7 may be formed with a hole to leak a small amount of exhaust gas for regeneration of the sub-filter 2. Alternatively, the bypass valve 7 itself may be installed in the bypass passage 21 in such a way as will allow gas leakage.

In this DPF apparatus, an exhaust gas pressure sensor 14 is installed at an exhaust gas inlet 15 of the case 3 to detect the pressure of the exhaust gas. The information on the exhaust gas pressure detected by the exhaust gas pressure sensor 14 is fed to the controller 10. Further, the controller 10 includes a revolution sensor 11 to detect the engine revolutions, a load sensor 12 to detect the load of the engine, and a temperature sensor 13 to detect the temperature of the exhaust gas. The controller 10 receives these detection signals representing the working condition of the engine to determine the particulate trapping condition that corresponds to a detected exhaust gas pressure-which is predetermined according to the engine working condition-and thereby control the opening timing of the bypass valve 7, i.e., regeneration timing of the main filter 1.

The DPF apparatus sets the gas ventilation resistance of the sub-filter 2 smaller than that of the main filter 1. The resistances to gas ventilation of the main filter 1 and sub-filter 2 can be set to desired values by selecting an appropriate material of the filters. This is achieved, for example, by setting the diameters of the fibers forming the sub-filter 2 larger than those of the fibers forming the main filter 1. The gas ventilation resistances of the main filter 1 and the sub-filter 2 can be set as follows. The gas ventilation resistances of the main filter 1 and the sub-filter 2 are set so as to satisfy the relationship of $Q_T/Q_{21} > 20$ where $Q_T$ represents a total amount of exhaust gas flow passing through the main filter 1 and the sub-filter 2 when the bypass valve 7 is opened to regenerate the main filter 1, and $Q_{21}$ represents an amount of exhaust gas flow passing through the main filter 1 when the main filter 1 is completely regenerated. Considering the excess air factor of the diesel engine, the value of $Q_T/Q_{21} > 20$ is determined from about 20% of air contained in the exhaust gas.

Figure 12:
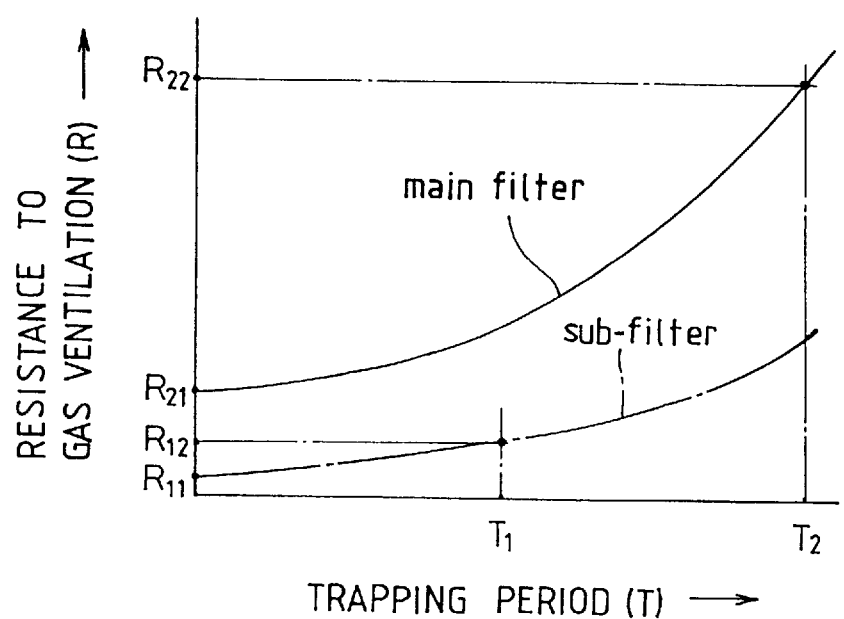
FIG. 12 is a graph showing the relationship between the resistance to gas ventilation of the main filter and sub-filter and the trapping period in the DPF apparatus incorporating this filter structure.

The setting of the gas ventilation resistances of the main filter 1 and sub-filter 2 in this DPF apparatus is described by referring to FIG. 12. FIG. 12 is a graph showing the variation of gas ventilation resistances R of the main filter 1 and sub-filter 2 versus the trapping period T in the DPF apparatus of FIG. 8. When the main filter 1 and sub-filter 2 with the function of filtering exhaust gas trap particulates contained in the exhaust gas, the pressure losses of the main filter 1 and subfilter 2 are as follows. When particulates are trapped and accumulate on the main filter 1 during the trapping period $T_2$ and the gas ventilation resistance $R_{22}$ of the main filter 1 reaches a predetermined pressure loss, the controller 10 issues a command to drive the actuator 8 to open the bypass valve 7 and to supply electricity to the mesh heater 6, heating the main filter 1 to regenerate it. As the main filter 1 is heated, the particulates trapped in the main filter 1 are heated and burned consuming $O_2$ in the exhaust gas and are converted into gases such as $CO_2$ and $H_2O$.

When the main filter 1 is regenerated, most of the exhaust gas at first flows through the sub-filter 2, with only a small amount of exhaust gas passing through the main filter 1. As the main filter 1 is regenerated, the gas ventilation resistance of the main filter 1 progressively decreases. At the same time as the particulates in the exhaust gas are caught by the sub-filter 2, the gas ventilation resistance of the sub-filter 2 gradually increases. Hence, as the regeneration of the main filter 1 proceeds, the gas ventilation resistances of the main filter 1 and sub-filter 2 balance each other, allowing the exhaust gas to flow to the main filter 1. It is important to ensure that during the regeneration of the main filter 1, an excess amount of exhaust gas and air will not flow to the main filter 1.

In this DPF apparatus, the particulates contained in the exhaust gas are caught in a specified amount by the main filter 1 for the duration of a specified time $T_2$, clogging the main filter 1. Let $R_{22}$ stand for the gas ventilation resistance of the main filter 1 when the main filter 1 starts to be regenerated. Because the exhaust gas is not supplied to the sub-filter 2, no particulates are accumulated on the sub-filter 2. The gas ventilation resistance of the sub-filter 2 at this time is taken as $R_{11}$. Let the gas ventilation resistance of the main filter 1 that has finished regeneration be $R_{21}$, and the gas ventilation resistance of the sub-filter 2 when the sub-filter 2 is clogged with particulates be $R_{12}$. When the regeneration of the main filter 1 is completed and the bypass valve 7 is opened, the following relation holds.

Because $1/R=(1/R_{12})+(1/R_{21})$, where R is the gas ventilation resistance of the filter as a whole $$R=R_{12}R_{21}/(R_{12}+R_{21}).$$

Hence, by using a pressure difference $\Delta P$, the function $Q_T$ of exhaust gas flow can be expressed as $$\Delta P=K\cdot Q_T\times[R_{12}\cdot R_{21}/(R_{12}+R_{21})], \text{ where K is a coefficient.}$$

If we let the function of exhaust gas flow for the main filter 1 be $Q_{21}$ and the function of exhaust gas flow for the sub-filter 2 be $Q_{12}$, then $$\Delta P=K\cdot R_{12}\cdot Q_{12}=R_{21}\cdot Q_{21}$$

$$Q_T=Q_{12}+Q_{21}$$

From the above equations, we get $Q_{21}/Q_T=R_{12}/(R_{12}+R_{21})$

As the regeneration of the main filter 1 proceeds, the particulates trapped in the main filter 1 are heated and burned. The gas ventilation resistance of the main filter 1 when this regeneration is completed is taken to be $R_{21}$. During the regeneration process, the sub-filter 2 is supplied with an exhaust gas and traps particulates for the duration of trapping time $T_1$. The gas ventilation resistance of the sub-filter 2 at this time is taken to be $R_{12}$. The exhaust gas flow for the main filter 1 is expressed by a function $Q_{21}$, and the exhaust gas flow for the sub-filter 2 is represented by a function $Q_{12}$. The main filter 1 needs to be in a condition that enables the particulates to be burned.

If, considering the excess air factor of the diesel engine, the amount of air contained in the exhaust gas is assumed to be about 20%, when the gas ventilation resistances of the main filter 1 and the sub-filter 2 are set in the range of $Q_{21}/Q_T<1/20$, the amount of air required to burn the particulates trapped in the main filter 1 can be supplied. That is, during the regeneration of the main filter 1, the main filter 1 is supplied with a volume of air large enough to heat and burn the particulates without the main filter 1 being cooled by the exhaust gas.

In this DPF apparatus, when the regeneration of the main filter 1 is complete, the sub-filter 2 has trapped, and therefore is loaded with, particulates contained in the exhaust gas. The bypass valve 7 is therefore closed to start regeneration of the sub-filter 2. At this time, the sub-filter 2 is heated by the thermal energy of the exhaust gas, which is accumulated in the sub-filter 2 because the sub-filter 2 is located inside the main filter 1. Hence, immediately after the bypass valve 7 is closed, electricity is supplied to the mesh heater 6 provided to the sub-filter 2 to burn the particulates trapped in the sub-filter 2 by using air contained in the exhaust gas leaking in through the bypass valve 7. In this way, the sub-filter 2 is regenerated.

The DPF apparatus with the above-mentioned construction works in the following manner. When the diesel engine is operating, an exhaust gas is sent through exhaust pipe to the exhaust gas passage 22. At this time, the bypass valve 7 is closed and the exhaust gas is supplied from the inlet 15 into the exhaust gas passage 22, from which the exhaust gas passes through the main filter 1. The exhaust gas is removed of particulates such as soot, carbon and smoke by the main filter 1 and the clean exhaust gas is discharged to the outlet 16. The trapped particulates accumulate on the main filter 1 and, as shown in FIG. 12, the gas ventilation resistance of the main filter 1 gradually increases with the trapping period. The controlled 10 receives detection signals from the revolutions sensor 11, load sensor 12 and temperature sensor 13 to determine the engine working condition, and decides, by checking a detected exhaust gas pressure, when the bypass valve 7 should be opened by activating the actuator 8.

When the exhaust gas pressure sensor 14 installed in the exhaust gas passage 22 detects a predetermined exhaust gas pressure, the main filter 1 should have trapped a sufficient amount of particulates. To regenerate the main filter 1, the controller 10 therefore issues a command for activating the actuator 8, which in turn opens the bypass valve 7. With the bypass valve 7 open, most of the exhaust gas flows through the bypass passage 21 and the sub-filter 2, with only a small portion of the exhaust gas flowing into the main filter 1. The controller 10 issues a command for supplying electricity to the mesh heater 6 via an electrode terminal 9, which then heats the main filter 1. The exhaust gas running through the sub-filter 2 has particulates therein trapped by the sub-filter 2, which is therefore loaded with the particulates. The gas ventilation resistance of the sub-filter 2 slowly increases from $R_{11}$ to $R_{12}$ as shown in FIG. 12.

When the mesh heater 6 heats the main filter 1, the particulates trapped in the main filter 1 are burned and transformed into $CO_2$ and $H_2O$ using air contained in a small amount of exhaust gas flowing through the main filter 1. The burned gas is discharged from the outlet 16. As the regeneration of the main filter 1 proceeds, the gas ventilation resistance of the main filter 1 gradually decreases from $R_{22}$ to $R_{21}$, as shown in FIG. 12. In this way, the regeneration of the main filter 1 is completed. The completion of the regeneration of the main filter 1 is determined by the controller 10 based on an exhaust gas pressure preset considering the engine operating condition. As the gas ventilation resistances of the main filter 1 and the sub-filter 2 balance each other, the exhaust gas flow progressively changes, with a decreasing amount of gas flowing into the sub-filter 2 and an increasing amount of gas flowing into the main filter 1. In this embodiment, the gas ventilation resistance $R_{21}$ of the main filter 1 when the regeneration of the main filter 1 is complete is set higher than the gas ventilation resistance $R_{12}$ of the sub-filter 2. Hence, also when the main filter 1 is completely regenerated, the amount of exhaust gas flowing into the sub-filter 2 is greater than that flowing into the main filter 1.

When the regeneration of the main filter 1 finishes, the controller 10 issues a command for activating the actuator 8 to close the bypass valve 7. When the bypass valve 7 is closed, the exhaust gas now flows from the exhaust gas passage 22 into the main filter 1, thus performing the normal exhaust gas processing, i.e., the particulate trapping processing by the main filter 1. At this time, a small amount of exhaust gas flows through a hole or gap formed in the bypass valve 7 into the bypass passage 21. Enclosed by the main filter 1, the bypass passage 21 accumulates heat. The particulates caught by the sub-filter 2 are burned by using air contained in the small amount of exhaust gas flowing from the bypass passage 21 to the sub-filter 2. In this way, the sub-filter 2 is regenerated. The DPF apparatus repeats the operation cycle mentioned above to continuously clean the exhaust gas.

Figure 10:
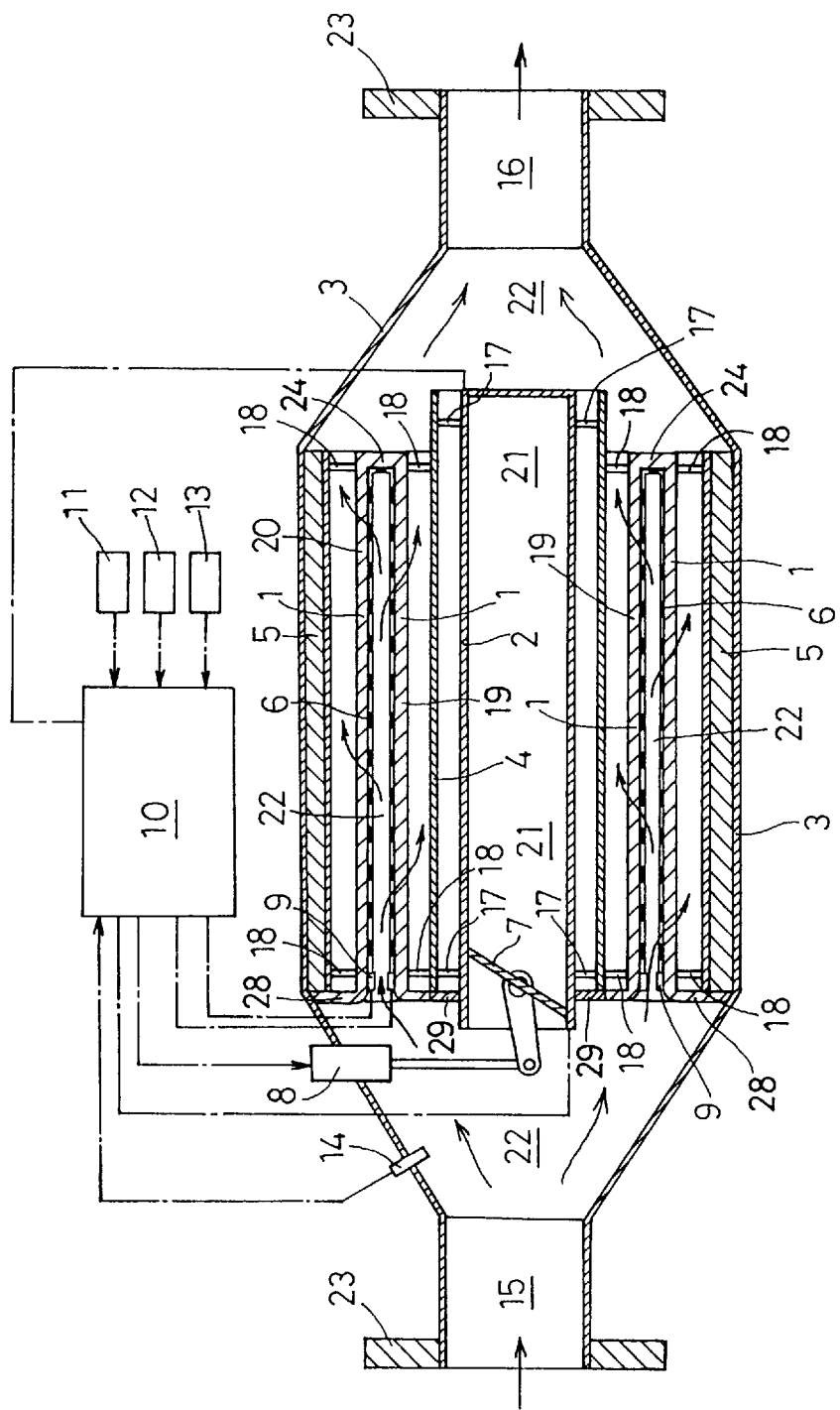
FIG. 10 is a cross section showing another example of the DPF apparatus employing the filter structure of this invention and showing the bypass valve closed.
Figure 11:
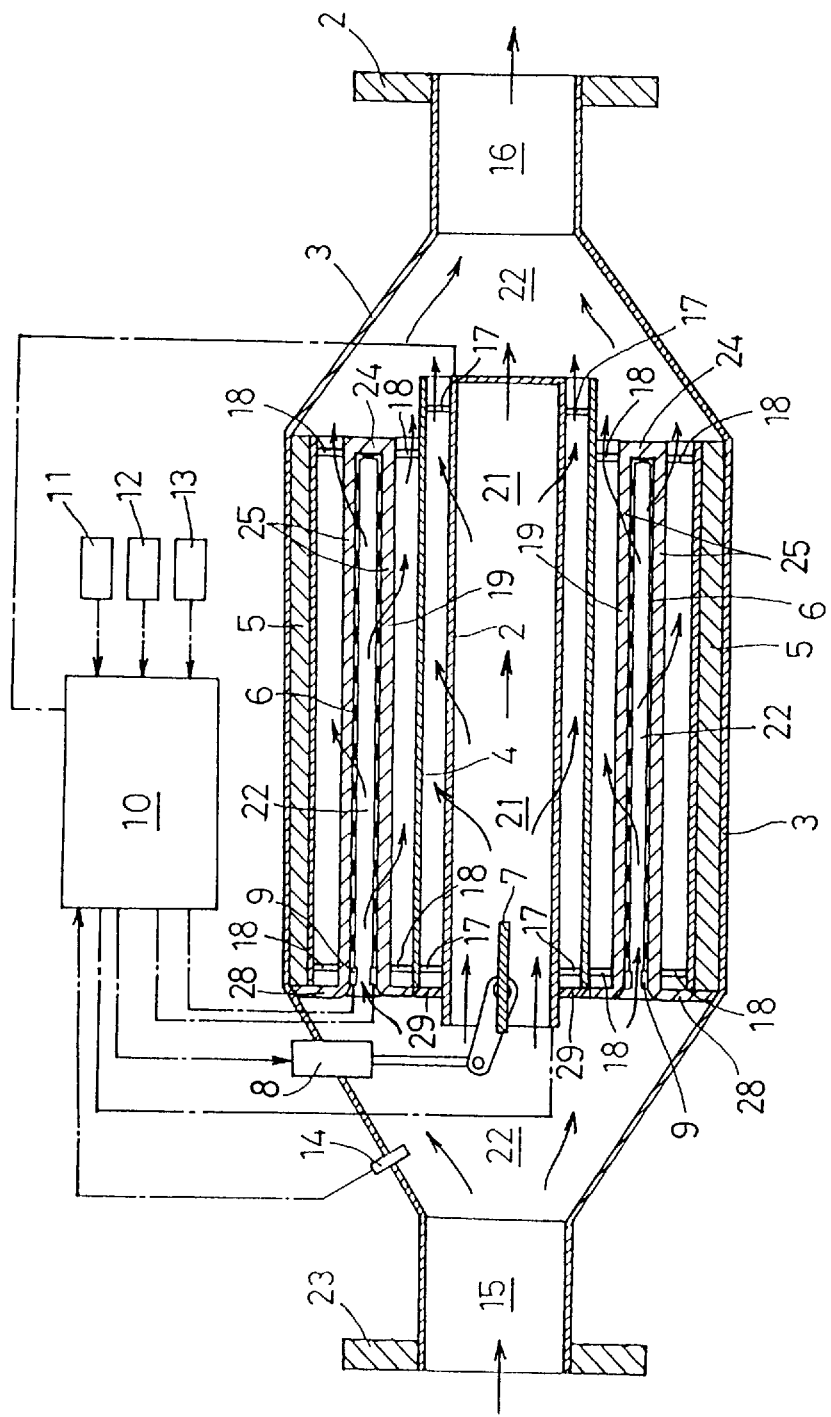
FIG. 11 is a cross section showing the bypass valve closed in the DPF apparatus of FIG. 10.

Next, by referring to FIG. 10 and 11, another embodiment of the DPF apparatus applying the above-mentioned filter structure is described. This embodiment has the same construction and function as the preceding embodiment, except that the sheet filter applied as the main filter is different in structure from that of the preceding embodiment. Like reference numerals represent identical components of the preceding embodiment and their explanations are omitted. In this embodiment of the DPF apparatus, the filter 27 of FIG. 3, the filter 35 of FIG. 5, filter 36 of FIG. 6, and filter 37 of FIG. 7 can be used as the main filter 1 and these filters 27, 35, 36, 37 without the mesh heater can be used as the subfilter 2.

This embodiment uses the above filters 27, 35, 36, 37 as the main filter 1. The main filter 1 comprises an inner cylinder 19 and an outer cylinder 20. The outer cylinder 20 uses the filters 27, 35, 36, 37, while the inner cylinder 19 uses a filter whose sheet filter 47 and the mesh heater 6 are arranged with their inside-outside relation reversed. In the exhaust gas passage 22 on the exhaust gas inlet 15 side, a shield plate 29 is provided between the sub-filter 2 and the bypass cylinder 4 to close the peripheral portion of the bypass passage 21 on the inlet side. On the end surface of the main filter 1 on the exhaust gas inlet 15 side, a platelike filter 24 is formed flat from the sheet filter 47. The DPF apparatus of this embodiment has the same construction, working and function as the preceding embodiment except for the structure of the main filter and the sub-filter, and hence their explanations are not presented here.

What is claimed is:

1. A diesel particulate filter apparatus comprising:
   a case incorporated in an exhaust system of a diesel engine;
   filters installed in the case to trap particulates contained in exhaust gas, the filters comprising a nonwoven cloth made of silicon carbide fibers and a woven cloth made of ceramic long fibers arranged in contact with and at least downstream of the nonwoven cloth with respect to the exhaust gas flow;
   mesh heaters arranged in contact with and upstream of the nonwoven cloth with respect to the exhaust gas flow, the mesh heaters being supplied with electricity to heat and burn particulates trapped in the filters; and
   a fixing member for firmly holding together the nonwoven cloth, the woven cloth and the mesh heaters.

2. A diesel particulate filter apparatus according to claim 1, wherein the ceramic long fibers forming the woven cloth are selected from long fibers of Si-C and Si-C-Ti-O.

3. A diesel particulate filter apparatus according to claim 1, wherein the woven cloth comprises a first woven cloth located upstream of the nonwoven cloth with respect to the exhaust gas flow and a second woven cloth located downstream of the nonwoven cloth with respect to the exhaust gas flow, and wherein gaps between the fibers of the first woven cloth are coarser than those of the second woven cloth.

4. A diesel particulate filter apparatus according to claim 3, wherein the mesh heaters are interposed between the nonwoven cloth and the first woven cloth.

5. A diesel particulate filter apparatus according to claim 1, wherein the mesh heaters comprise heat-resistant steel wires containing Ni-Cr and the surfaces of the mesh heaters are coated with a nonconductive material of $Al_2O_3$.

6. A diesel particulate filter apparatus according to claim 19, wherein the heat-resistant steel wires attached to the surface of the mesh heaters are coated with $Al_2O_3$.

* * * * *